United States Patent
Lee et al.

(10) Patent No.: US 7,639,636 B2
(45) Date of Patent: Dec. 29, 2009

(54) METHOD OF SEARCHING FOR BROADCASTING CHANNEL OF SPECIFIC PROGRAM IN A DMB RECEIVING TERMINAL

(75) Inventors: Young-Sik Lee, Seoul (KR); Hoon Yoo, Suwon-si (KR); Kyung-Hee Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 506 days.

(21) Appl. No.: 11/330,764

(22) Filed: Jan. 12, 2006

(65) Prior Publication Data

US 2006/0153104 A1 Jul. 13, 2006

(30) Foreign Application Priority Data

Jan. 12, 2005 (KR) .................. 10-2005-0002941

(51) Int. Cl.
*H04B 7/00* (2006.01)
(52) U.S. Cl. .................. 370/310; 370/313; 725/37; 725/38; 725/61; 725/62; 725/63
(58) Field of Classification Search .......... 370/310, 370/313; 725/37, 38, 61, 62, 63
See application file for complete search history.

(56) References Cited

U.S. PATENT DOCUMENTS

| 2005/0047596 | A1* | 3/2005 | Suzuki ................ 380/239 |
| 2005/0068204 | A1* | 3/2005 | Jeon et al. ............ 341/50 |
| 2005/0068977 | A1* | 3/2005 | Na et al. ............. 370/432 |
| 2005/0203927 | A1* | 9/2005 | Sull et al. ........... 707/100 |
| 2006/0064716 | A1* | 3/2006 | Sull et al. ........... 725/37 |
| 2006/0233065 | A1* | 10/2006 | Takakuwa et al. ... 369/30.04 |

* cited by examiner

*Primary Examiner*—Joseph H Feild
*Assistant Examiner*—Huy D Nguyen
(74) *Attorney, Agent, or Firm*—The Farrell Law Firm, LLP (57) ABSTRACT

A method of searching for a broadcasting channel of a specific program in a digital multimedia broadcasting (DMB) receiving terminal. The method includes detecting a program number input by a user, determining whether particular bits in a header of a received transport stream (TS) packet are identical to fixed values for the particular bits in the header, if the particular bits in the header are identical to the fixed values for the particular bits in the header, determining whether particular bits in a payload of the TS packet are identical to fixed values for the particular bits in the payload, and if the particular bits in the payload are identical to the fixed values for the particular bits in the payload, determining that the TS packet has program map table (PMT) information, and analyzing the PMT information to detect a packet identifier (PID) of an audio/video packetized elementary stream (PES) constituting the specific program.

4 Claims, 6 Drawing Sheets

| 8 | 1 | 1 | 2 | 12 | 16 | 2 |
|---|---|---|---|----|----|----|
| table identifier | Section syntax indicator | Reserved future indicator | reserved | Section length | Broadcasting program number ID | reserved |
| 0x02 | 1 | 0 | 11 | 00? | ? | 11 |

| 5 | 1 | 8 | 8 | 3 | 13 | 4 | 12 | |
|---|---|---|---|---|----|---|----|---|
| Version number | Current next indicator | Section number | Last section number | reserved | PCR_PID | reserved | Program information length | ... |
| | | | | 111 | | 1111 | | |

METHOD OF SEARCHING FOR BROADCASTING CHANNEL OF SPECIFIC PROGRAM IN A DMB RECEIVING TERMINAL

PRIORITY

This application claims priority under 35 U.S.C. § 119 to an application entitled "Method of Searching for Broadcasting Channel of Specific Program in a DMB Receiving Terminal" filed in the Korean Intellectual Property Office on Jan. 12, 2005 and assigned Serial No. 2005-2941, the contents of which are incorporated herein by reference.

BACKGROUND OF THE INVENTION

1. Field of the Invention

The present invention relates generally to a Digital Multimedia Broadcasting (DMB) receiving terminal in a DMB system, and in particular, to a method for reducing the time required for searching for a broadcasting channel of a program selected by a user in a DMB receiving terminal.

2. Description of the Related Art

Figure 1:
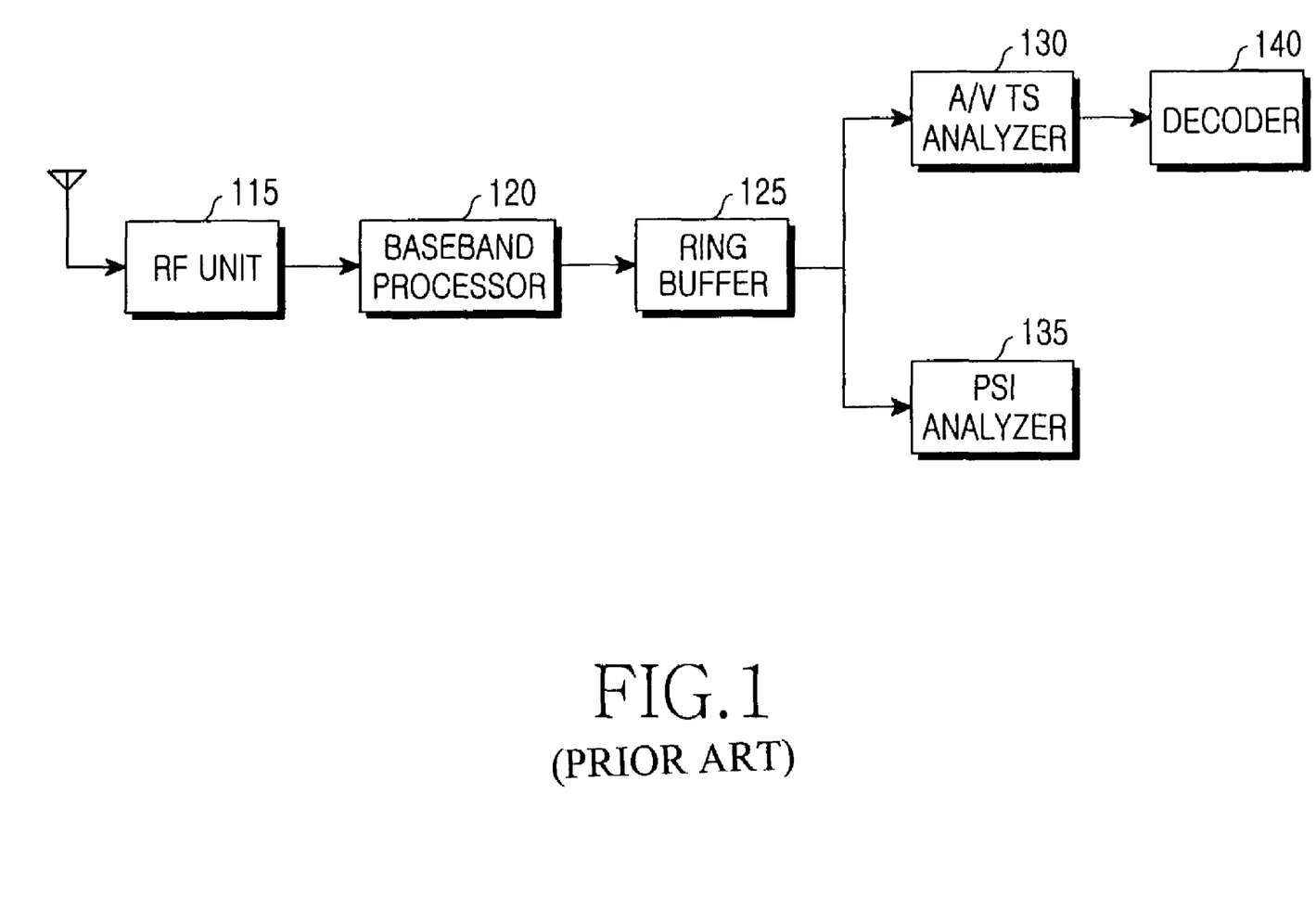
FIG. 1 is a diagram illustrating a schematic structure of a DMB receiving terminal.

FIG. 1 is a diagram illustrating a schematic structure of a DMB receiving terminal.

A DMB terminal receives a signal transmitted by a DMB system via its radio frequency (RF) unit 115, and provides the received signal to a baseband processor 120. The baseband processor 120 converts the received signal into MPEG-2 transport stream (TS) data, and stores the TS data in a ring buffer 125. A program specific information (PSI) analyzer 135 analyzes the TS data stored in the ring buffer 125 to detect a program association table (PAT) and a program map table (PMT). After acquiring, from the detected PMT, packet identifier (PID) information of a desired audio/video packetized elementary stream (PES) of a broadcasting program, an audio/video TS (A/V TS) analyzer 130 gathers packets having a corresponding PID, and provides the packets to a decoder 140, which sequentially decodes the packets.

Figure 2:
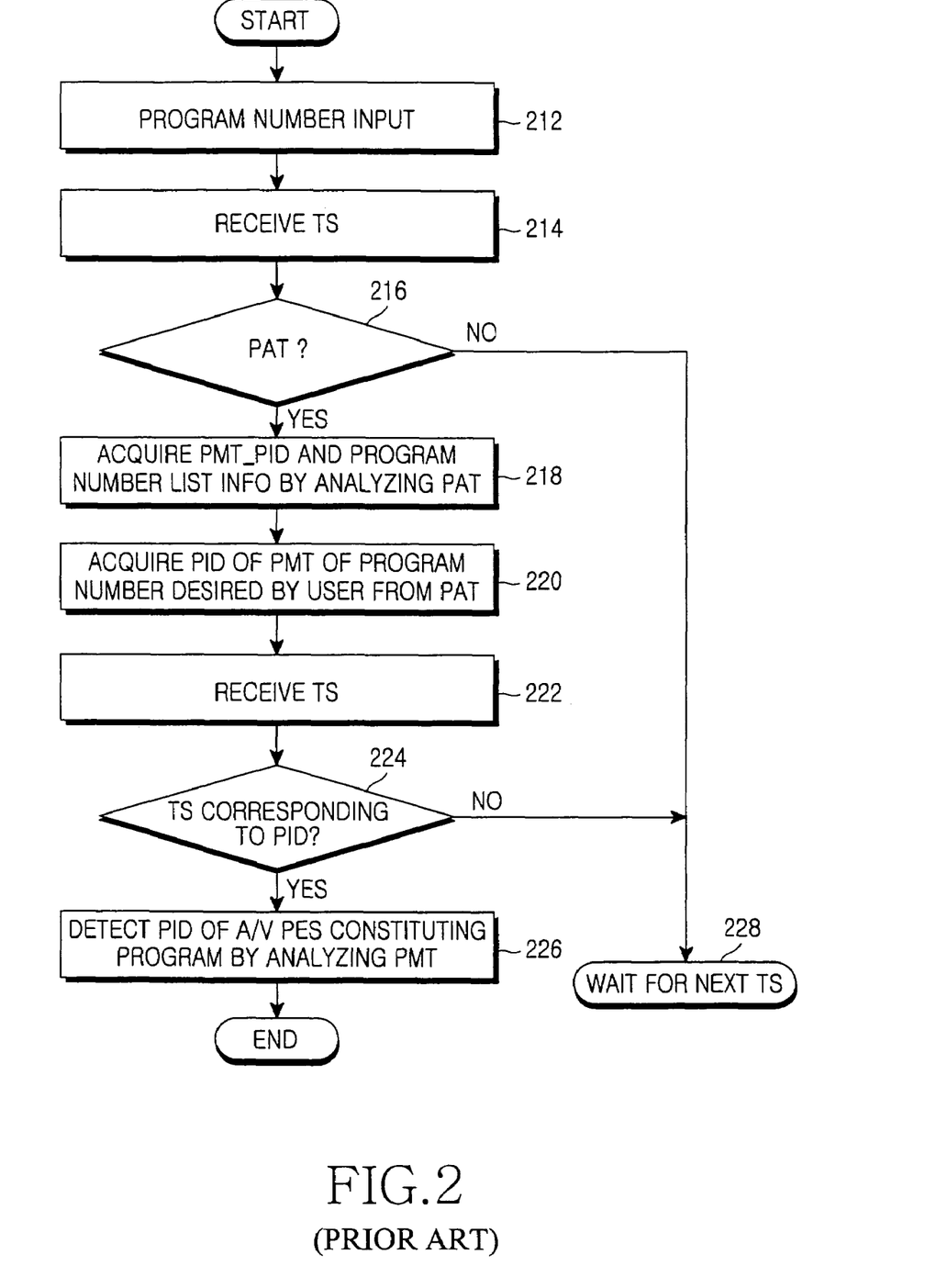
FIG. 2 is a flowchart illustrating a method of searching for a broadcasting channel of a program selected by a user in the conventional DMB receiving terminal.

FIG. 2 is a flowchart illustrating a method of searching for a broadcasting channel of a program selected by a user in the conventional DMB receiving terminal.

When a user inputs a desired program number, a DMB receiving terminal detects the program number input by the user in step 212, and receives a TS packet in step 214. The DMB receiving terminal checks in step 216 whether the received TS packet has a PAT. The PAT refers to a table having information on a program, included in the currently transmitted packet, and includes a program number, audio and video constituting the program and a PID (PMT_PID) of a PMT having PIDs of packets such as a program clock reference (PCR). That is, the PAT serves to map a logical program (e.g., a particular channel) selected by the user to an actual PID.

To determine whether there is any packet having PAT information among the consecutively received TS packets, the DMB receiving terminal analyzes a header of a TS packet and determines whether its PID is '0'. Herein, PID='0' indicates that PAT information is included in a payload.

If it is determined in step 216 that the received TS packet has no PAT, the DMB receiving terminal proceeds to step 228 where it waits for the next TS packet. However, if the received TS packet has a PAT, the DMB receiving terminal analyzes the PAT and acquires PMT_PID and program number list information in step 218. The DMB receiving terminal acquires a PMT_PID of a program number desired by the user from the PAT in step 220, and receives the TS packet in step 222. Thereafter, in step 224, the DMB receiving terminal analyzes a header of the received TS packet and determines whether the received TS packet is a TS packet corresponding to the PMT_PID. If it is determined that the received TS packet is not a TS packet corresponding to the PMT_PID, the DMB receiving terminal proceeds to step 228 where it waits for the next TS packet. However, if the received TS packet is a TS packet corresponding to the PMT_PID, i.e., if the received TS packet has a PMT, the DMB receiving terminal analyzes the PMT and detects a PID (PES_PID) of an audio/video PES constituting a corresponding program in step 226, and then ends the procedure.

Although not illustrated, upon detecting the PES_PID, the DMB receiving terminal detects an audio/video PES having the PES_PID among the TS packets received thereafter, and decodes the audio/video PES. The decoding result is provided to a display and a speaker so that the user can view and hear the DMB.

The PAT and PMT information is transmitted periodically such that the user can randomly access the terminal. For example, if the PAT and PMT information is transmitted every 0.5 seconds, the terminal requires a maximum of one second in detecting the PAT and PMT information, and the time requirement occurs not only when the terminal initially starts but also when it changes the channel. This causes the terminal user to have to wait for a considerable amount of time, leading to a decrease in terminal preference and marketability.

SUMMARY OF THE INVENTION

It is, therefore, an object of the present invention to provide a method for reducing the time required for searching for a broadcasting channel of a desired program selected by a user in a DMB receiving terminal.

To achieve the above and other objects, there is provided a method of searching for a broadcasting channel of a specific program in a digital multimedia broadcasting (DMB) receiving terminal. The method includes the steps of detecting a program number input by a user, checking whether particular bits in a header of a received transport stream (TS) packet are identical to fixed values for the particular bits in the header, if the particular bits in the header are identical to the fixed values, determining whether particular bits in a payload of the TS packet are identical to fixed values for the particular bits in the payload, and if the particular bits in the payload are identical to the fixed values for the particular bits in the payload, determining that the TS packet has program map table (PMT) information, and analyzing the PMT information to detect a packet identifier (PID) of an audio/video packetized elementary stream (PES) constituting the program.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 3:
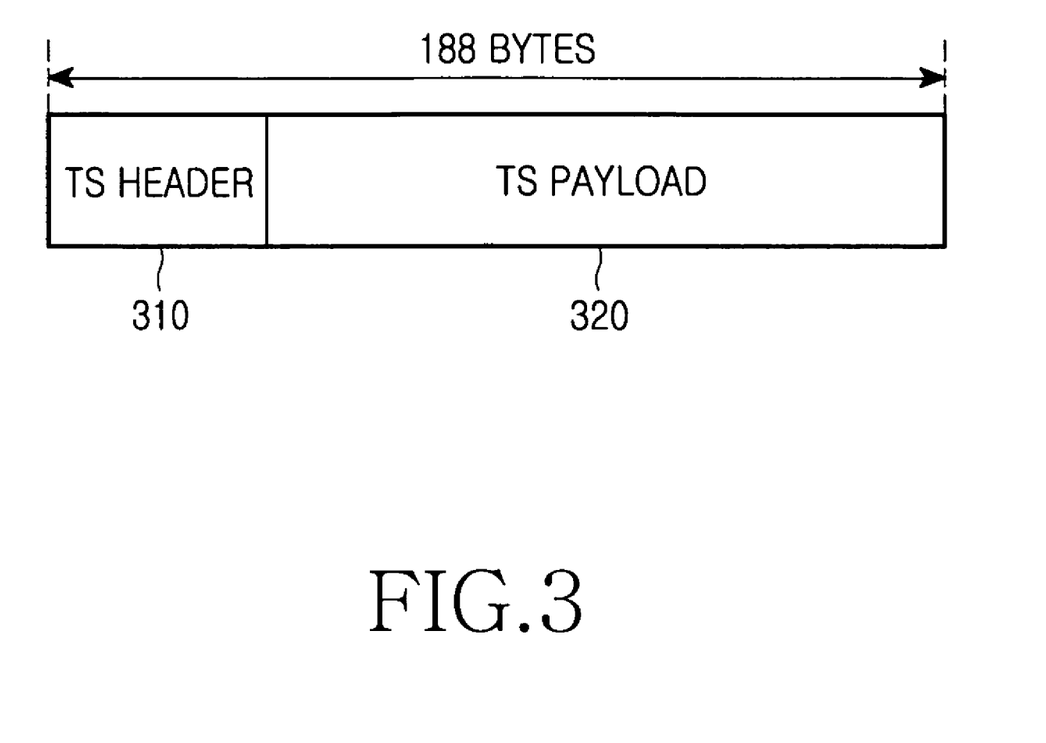
FIG. 3 is a diagram illustrating a format of a TS packet.

FIG. 3 is a diagram illustrating a format of a TS packet.

An MPEG-2 TS packet is shown by way of example, and the full packet consists of 188 bytes. In the packet, a header part 310 includes a 13-bit PID. If the PID is '0', PAT information is included in a payload part 320 of the packet.

Figure 4:
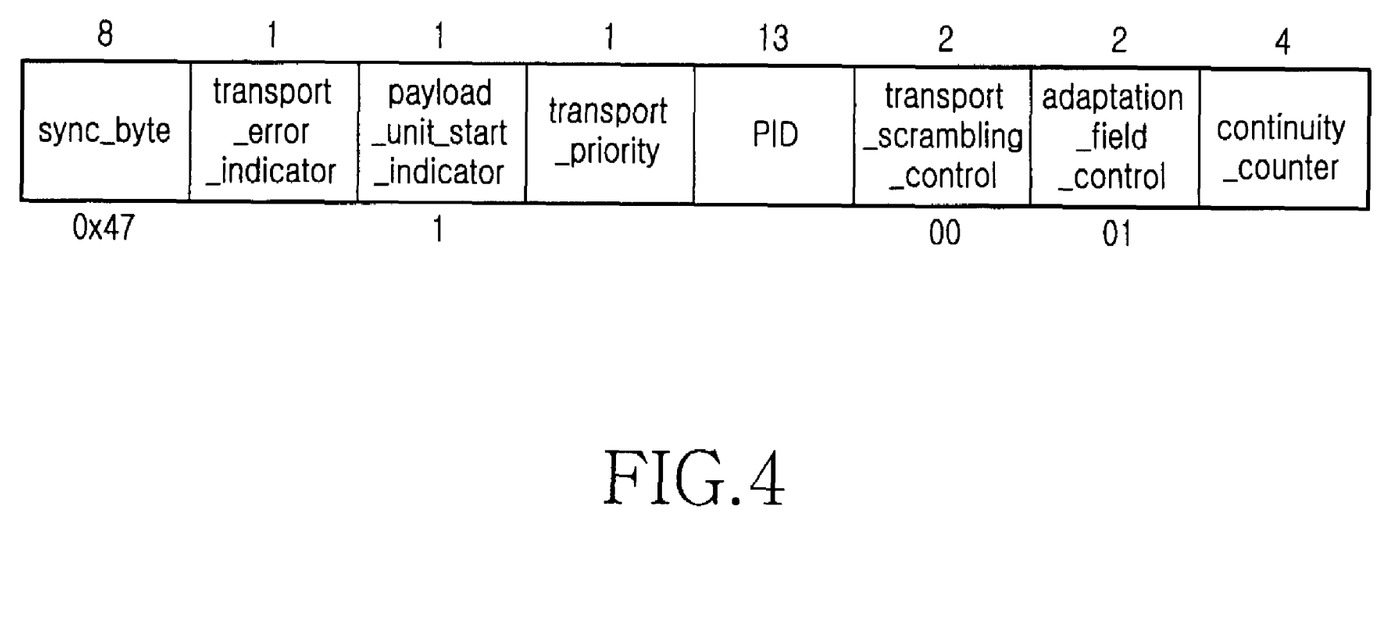
FIG. 4 is a diagram illustrating a detailed format of a header of a TS packet when a payload of the TS packet has PMT information.

FIG. 4 is a diagram illustrating a detailed format of a header of a TS packet when a payload of the TS packet has PMT information.

Numerals shown above the format diagram represent the number of bits constituting their associated fields, and numerals shown below the format diagram represent fixed values of parameters defined for their associated fields. That is, a field defining a parameter 'sync_byte' has 8 bits, and its value is always fixed to '0x47(0100 0111)'. A field defining a parameter 'payload_unit_start_indicator' has 1 bit, and its value is always fixed to '1'. A field for defining a parameter 'transport_scrambling_control' has a 2-bit size, and its value is fixed to '00'. In addition, a field for defining a parameter 'adaptation_field_control' has a 2-bit size, and its value is fixed to '01'.

Although not illustrated, if an adaptation field exists after the header of the TS packet, the present invention can be applied only when a value of a parameter 'table identifier' of the payload is '0x02' after the field is removed by the length defined by a parameter 'adaptation_field_length' in the adaptation field.

Figure 5:
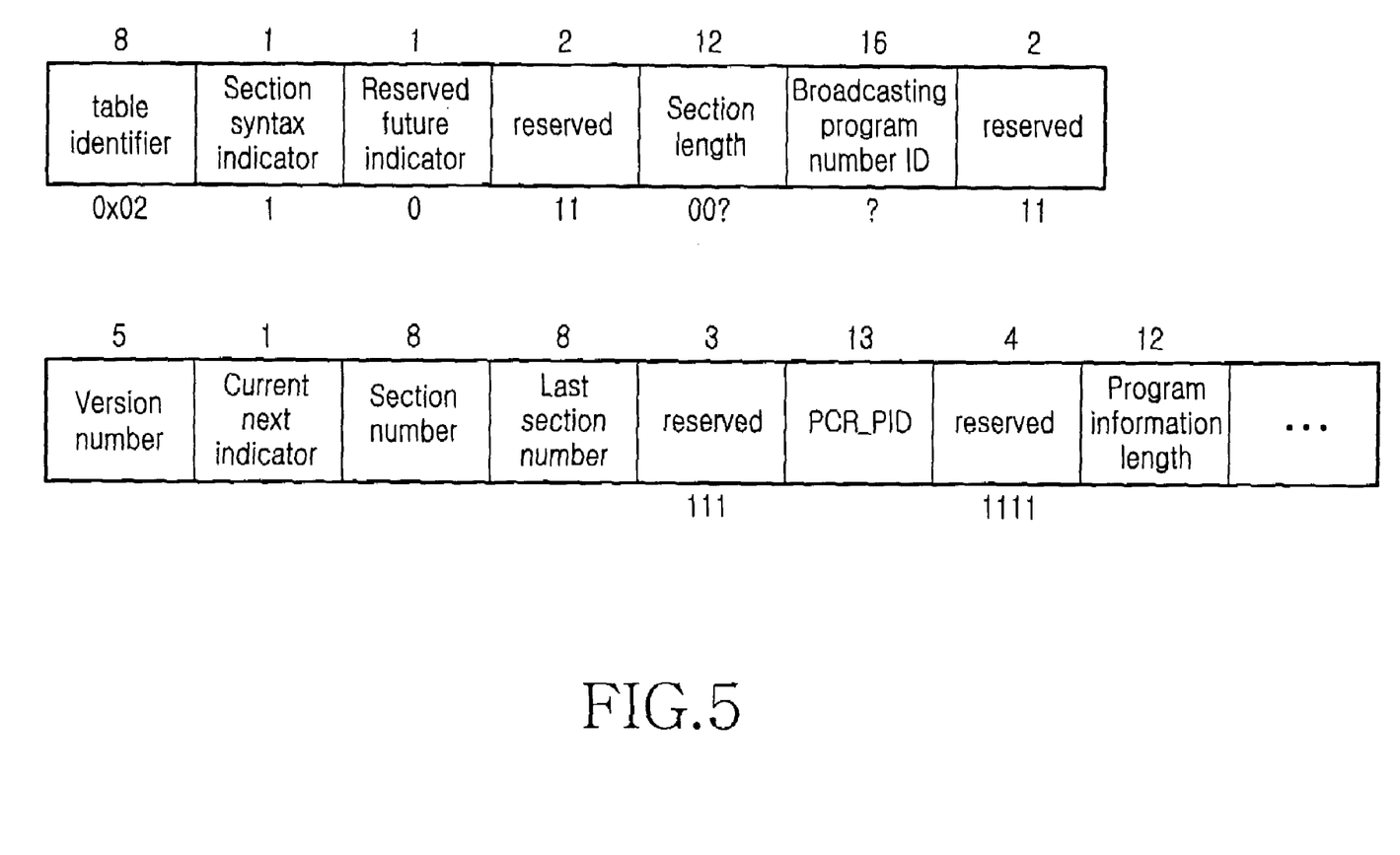
FIG. 5 is a diagram illustrating a detailed format of a payload of a TS packet when a payload of the TS packet has PMT information.

FIG. 5 is a diagram illustrating a detailed format of a payload of a TS packet when a payload of the TS packet has PMT information.

As illustrated, PMT information includes a plurality of parameters of 'table identifier', 'Section syntax indicator', 'Reserved future indicator', 'Section length', 'Broadcasting program number ID', 'Current next indicator', 'Section number', 'Last section number', 'PCR_PID', 'Program information length', etc. Similar to FIG. 4, numerals shown above the format diagram in FIG. 5 represent the number of bits constituting their associated fields, and numerals shown below the format diagram represent fixed values of their associated parameters when the TS packet has PMT information. For example, a field defining the parameter 'table identifier' has 8 bits, and its value is fixed to '0x02'. A mark '?' represents "variable." Thus, a field defining the parameter 'Section length' has 12 bits, and only the values of its first two bits are fixed.

Since the parameters shown in FIGS. 4 and 5 are well known in this field, a detailed description thereof will be omitted for simplicity.

Figure 6:
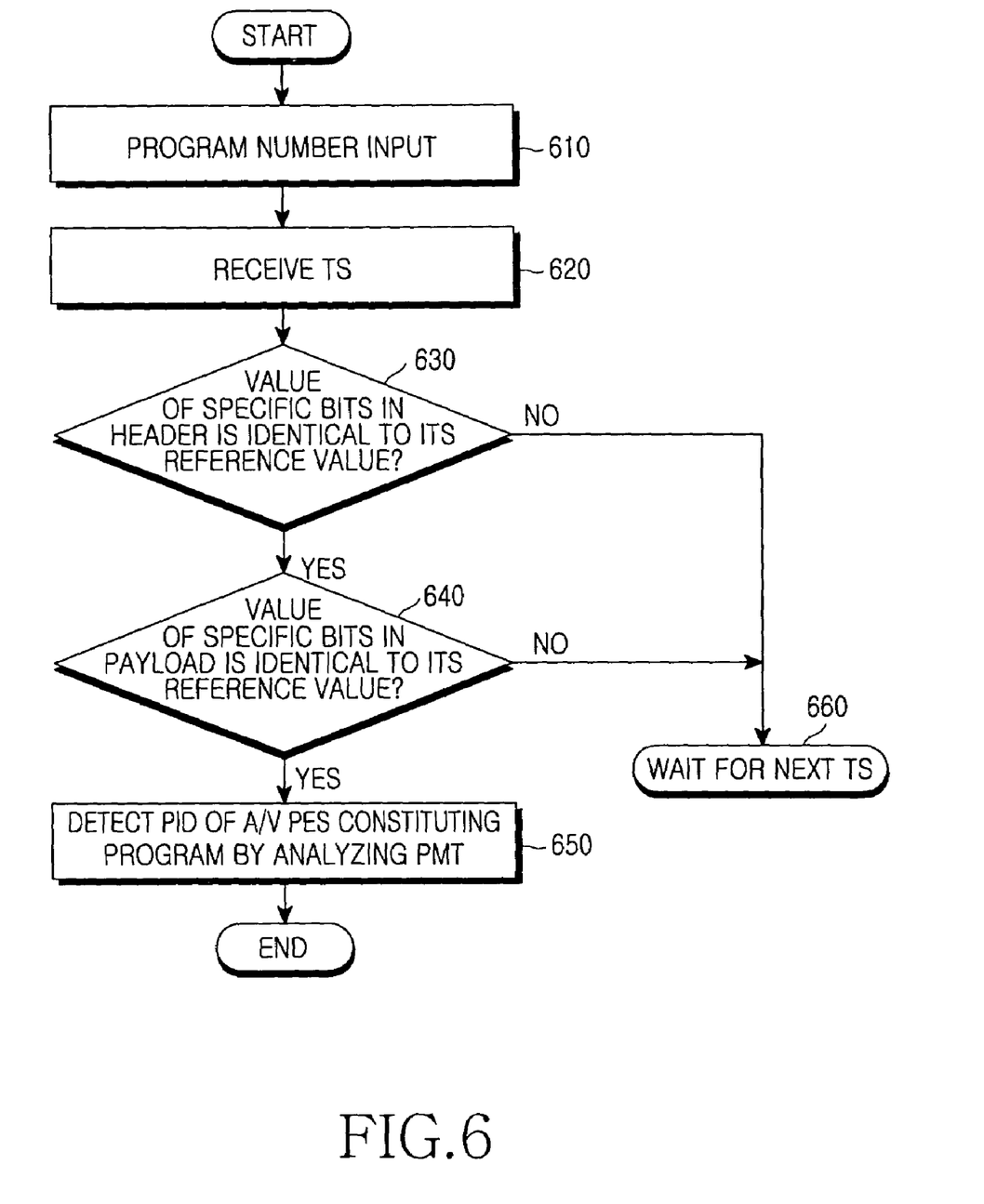
FIG. 6 is a flowchart illustrating a method of searching for a broadcasting channel of a program selected by a user in a DMB receiving terminal according to a preferred embodiment of the present invention.

FIG. 6 is a flowchart illustrating a method of searching for a broadcasting channel of a program selected by a user in a DMB receiving terminal according to a preferred embodiment of the present invention.

If a user inputs a desired program number, a DMB receiving terminal detects the program number input by the user in step 610, and receives a TS packet in step 620. The DMB receiving terminal determines in step 630 whether a value of specific bits in a header of the received TS packet is identical to its reference value. If it is determined that the bit value is identical to its reference value, the DMB receiving terminal determines in step 640 whether a value of specific bits in a payload of the received TS packet is identical to its reference value. If the bit value is identical to its reference value, the DMB receiving terminal analyzes the PMT and detects a PH) (PES_PID) of an audio/video PES constituting a corresponding program in step 650, determining that the received TS packet is a packet having the PMT information.

However, if it is determined in step 630 that the specific bit value in the header is not identical to its reference value or if it is determined in step 640 that the specific bit value in the payload is not identical to its reference value, the DMB receiving terminal proceeds to step 660 where it awaits the next TS packet.

Although not illustrated, upon detecting the PES_PID, the DMB receiving terminal detects an audio/video PES having the PES_PID among the TS packets received thereafter, and decodes the audio/video PES. The decoding result is provided to a display and a speaker so that the user can view the DMB.

Compared with the conventional method of FIG. 2 in which an operation of searching for a broadcasting channel of a program desired by a user is performed in the order of 'PAT detection->PMT detection->detection of a PID of an audio/video PES of a program designated by the PMT', the novel method directly performs the PMT detection without the PAT detection, thereby rapidly searching for the broadcasting channel.

With reference to FIGS. 4 and 5, a detailed description will now be made of the process of checking in step 630 whether a value of specific bits in the header is identical to its reference value and the process of checking in step 640 whether a value of specific bits in the payload is identical to its reference value.

Among the received TS packets, a packet having PMT information is characterized in that specific bits in its header and payload have fixed values. In other words, since a TS packet having PMT information in its payload part has specific bits having a value that is always fixed, the DMB receiving terminal regards the fixed bit value as a reference value and compares bit values of a received TS packet with the reference value. If all of the bit values are identical to the reference value, the DMB receiving terminal can determine that the corresponding TS packet is a packet having PMT information.

Referring to FIG. 4, fixed bits in the header include the 8 bits for defining the parameter 'sync_byte', the 1 bit for defining the parameter 'payload_unit_start_indicator', the 2 bits for defining the parameter 'transport_scrambling_control', and the 2 bits for defining the parameter 'adaptation_field_control', totaling 13 bits. However, since the parameter 'sync_byte', which is constant in a header of every TS packet, essentially cannot be used to distinguish the PMT information, it is excluded.

Referring to FIG. 5, fixed bits in the payload include the 8 bits for defining the parameter 'table identifier', the 1 bit for defining the parameter 'Section syntax indicator', the 1 bit for defining the parameter 'Reserved future indicator', the 2 bits among the 12 bits for defining the parameter 'Section length', and 4 'reserved' fields (2+2+3+4=11 bits), totaling 23 bits.

As shown in FIG. 5, a value of the parameter 'Broadcasting program number ID' indicating information on a program number desired by the user is variable. However, since the terminal can have knowledge of the channel number selected by the user, the parameter can be regarded as a fixed value.

In sum, the fixed bits in the header and payload of the TS packet amount to a total of 44 bits (=13−8+23+16). Therefore, the terminal determines whether the 44 bits in the received TS packet are all identical to their fixed values. If they are identical, the terminal determines that the corresponding TS packet is a packet having PMT information.

As can be understood from the foregoing description, in the process of searching for a broadcasting channel of a program selected by the user, the novel DMB terminal can directly perform the PMT detection without the PAT detection, thereby reducing its initial startup time by a maximum of 'PAT reception time+PMT reception time'. For example, if the PAT transmission period and the PMT transmission period each are 0.5 seconds, the DMB terminal can reduce the initial startup time by a maximum of 1 second.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of searching for a broadcasting channel of a specific program in a digital multimedia broadcasting (DMB) receiving terminal, the method comprising the steps of:

detecting a program number input by a user;

determining whether particular bits in a header of a received transport stream (TS) packet are identical to fixed values for the particular bits in the header;

if the particular bits in the header are identical to the fixed values for the particular bits in the header, determining whether particular bits in a payload of the TS packet are identical to fixed values for the particular bits in the payload; and if the particular bits in the payload are identical to the fixed values for the particular bits in the payload, determining that the TS packet has program map table (PMT) information, and analyzing the PMT information to detect a packet identifier (PID) of an audio/video packetized elementary stream (PES) constituting the specific program.

2. The method of claim 1, wherein the particular bits in the header include bits for defining a parameter 'payload_unit_start_indicator', bits for defining a parameter 'transport_scrambling control' and bits for defining a parameter 'adaptation_field_control';

wherein the particular bits in the payload include bits for defining a parameter 'table identifier', bits for defining a parameter 'Section syntax indicator', bits for defining a parameter 'Reserved future indicator', bits for defining a parameter 'Section length', bits for defining 4 reserved fields and bits for defining a parameter 'Broadcasting program number ID' indicating information on a program number desired by the user.

3. The method of claim 2, wherein the parameter 'Section length' in the payload has 12 bits, and 2 of the 12 bits have fixed values.

4. A method of searching for a broadcasting channel of a specific program in a digital multimedia broadcasting (DMB) receiving terminal, the method comprising the steps of:

detecting user input when the user inputs a desired program number;

detecting a consecutively received transport stream (TS) packet;

analyzing whether the (TS) packet includes a program map table (PMT);

determining that the TS packet has a PMT if particular bits in a header and a payload of the received TS packet are identical to fixed values; and detecting an audio/video packetized elementary stream having a packet identifier.

* * * * *

UNITED STATES PATENT AND TRADEMARK OFFICE
CERTIFICATE OF CORRECTION

PATENT NO. : 7,639,636 B2 Page 1 of 1
APPLICATION NO. : 11/330764
DATED : December 29, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Ninth Day of November, 2010

David J. Kappos
*Director of the United States Patent and Trademark Office*